US007546086B2

(12) United States Patent
Hansson

(10) Patent No.: US 7,546,086 B2
(45) Date of Patent: Jun. 9, 2009

(54) AD-HOC MESSAGING BETWEEN WIRELESS DEVICES

(75) Inventor: Magnus Hansson, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 726 days.

(21) Appl. No.: 11/020,980

(22) Filed: Dec. 24, 2004

(65) Prior Publication Data

US 2005/0250445 A1 Nov. 10, 2005

Related U.S. Application Data

(60) Provisional application No. 60/568,676, filed on May 7, 2004.

(51) Int. Cl.
*H04B 7/00* (2006.01)
(52) U.S. Cl. ............. 455/41.2; 455/517; 455/518; 455/519; 455/520
(58) Field of Classification Search ............ 455/517, 455/518, 519, 520, 521, 41.2
See application file for complete search history.

(56) References Cited

U.S. PATENT DOCUMENTS

| 7,231,206 | B2 * | 6/2007 | Cudak et al. ............ 455/414.2 |
| 7,260,362 | B2 * | 8/2007 | Teibel ..................... 455/69 |
| 2001/0012275 | A1 | 8/2001 | Caldwell et al. |
| 2002/0058502 | A1 | 5/2002 | Stanforth |
| 2002/0080750 | A1 | 6/2002 | Belcea |

FOREIGN PATENT DOCUMENTS

| EP | 1 176 840 A | 1/2002 |
| KR | 2003/023930 A | 3/2003 |
| KR | 2003/024435 A | 3/2003 |
| WO | WO 02/078284 A2 | 10/2002 |
| WO | WO 2004/030384 A2 | 4/2004 |

OTHER PUBLICATIONS

International Search Report for PCT/EP2005/004397, dated Jul. 26, 2005.
Written Opinion for PCT/EP2005/004397, dated Jul. 26, 2005.
Rosenberg, J. et al., "Session Initiation Protocol SIP Extension for Instant Messaging," Network Working Group Request for Comments 3428, www.ietf.org/rfc/rfc3428.txt, Dec. 2002, pp. 1-18.
Rosenberg, J. et al., "SIP: Session Initiation Protocol," Network Working Group Request for Comments 3261, Jun. 2002, XP015009039, pp. 1-269.
Haartsen, J.C., "The Bluetooth Radio System," IEEE Personal Communications, pp. 6-14, Feb. 2000.

\* cited by examiner

*Primary Examiner*—Tuan A Pham
(74) *Attorney, Agent, or Firm*—Potomac Patent Group PLLC

(57) ABSTRACT

A message is communicated from a first short-range transceiver device to other short-range transceiver devices by determining a set of identifiers of other short-range transceiver devices known by the short-range transceiver device to be within direct communication range of the first short-range transceiver device. An outbound served nodes list is created that includes identifiers of other short-range transceiver devices known either to already have encountered the message or to be members of the set of identifiers. The message and the outbound served nodes list are incorporated into an outbound data structure. For each short-range transceiver whose identifier is a member of the set of identifiers, a previously nonexisting communication link is initiated; the outbound data structure is transmitted to the short-range transceiver; and in response to a completed delivery of the outbound data structure, the communication link is terminated.

30 Claims, 3 Drawing Sheets

AD-HOC MESSAGING BETWEEN WIRELESS DEVICES

CROSS REFERENCE TO RELATED APPLICATIONS

This application claims the benefit of U.S. Provisional Application No. 60/568,676, filed May 7, 2004, which is hereby incorporated herein by reference in its entirety.

BACKGROUND

The invention relates to mobile telephones and other mobile devices having an integrated radio for local communication. More particularly, the invention relates to the use of such devices for wireless messaging between users in a local network.

ICQ ("I-seek-you") is an Internet based service that enables PC users to chat with each other over the Internet. By "chatting" is meant the ability to send and receive instant messages within a chat group. Chat groups may be formed between people who know each other, who share the same interests or who just have a desire to communicate.

Mobile telephones are often equipped with hardware and software for supporting some type of Short Message Service (SMS) provided by the mobile telephone service provider. By means of the service, the user can create simple text messages and send them over the cellular network to other users. Some mobile phones and service providers also support a "chat mode," which is a software application that displays a chain of sent and received messages between two or several users.

Recently, mobile telephones have been introduced that include an additional short-range radio transceiver for enabling local communication between itself and other similarly equipped devices. Examples of such short-range transceivers are Bluetooth® transceivers, Wireless Local Area Network (WLAN) (e.g., operating in accordance with any of the IEEE 802.11 standards), and in the future also Ultra Wide Band. The short-range transceiver is used to access various local voice and data services.

Many of these short-range transceivers provide the ability to establish ad-hoc connections to other such devices by means of relatively simple user-interaction. Unlike mobile communications such as cellular telephones, the ad-hoc connectivity provided by the short-range transceivers does not require the support of any infrastructure.

Taking Bluetooth® technology as an example, ad-hoc connections can enable devices to be connected with one another in a star topology. In this arrangement, one device assumes the role of a master having the ability to connect to from one to seven other devices that assume the role of slaves. This type of networking arrangement is called a piconet. The master in the piconet can send data to the slaves and can also poll the slaves to enable them to send data to the master. The master also controls and coordinates other network management functions of the piconet.

Individual piconets can be inter-connected. In this case at least one of the involved devices (referred to in this context as a bridge node) must participate in at least two piconets at the same time. This type of networking topology is called a scatternet.

Scatternet techniques allow a large number of devices to form a network. By applying multi-hop techniques in a scatternet it is possible to extend the range in which two devices can communicate with each other. That is, devices that are not participating in the same piconet can nonetheless communicate with one another by routing their communication packets through the bridge node, which then takes steps to ensure that the information packets are passed on to their intended final destination. The term "multi-hop" here refers to the forwarding of a message by at least one intermediate node on its way to its intended destination. The technique is not used in a single Bluetooth piconet, but can be used in mesh-networks (e.g., Internet or IEEE 802.15.4). There is no multi-hop routing mechanism specified by the Bluetooth® standard.

Each Bluetooth® device has its own unique 48-bit address, known as a Bluetooth® Device (BD) address.

Further details about the Bluetooth® standard can be found in the Bluetooth specification published by the Bluetooth Special Interest Group (SIG). A good overview is presented in J. Haartsen, "The Bluetooth Radio System", IEEE Personal Communications, pp. 6-14, February 2000.

One way to implement a wireless messaging application like "chat" between short-range mobile devices is to establish and maintain a scatternet topology. However operating a scatternet has some drawbacks; for example, it requires complex scheduling, networking and mobility management.

The scheduling is complex, especially for nodes that need to participate in more than one piconet (i.e., the bridge nodes). Such a node needs to share its presence in real time between multiple piconets. In doing that, it needs to manage two independent piconet clocks and their drift in relation to each other.

Networking can be accomplished through routing, where routing tables are created. Routing tables keep track of different possible data paths between devices in the scatternet. The routing tables can either be established before any messaging has been initiated or they can be created every time they are needed (e.g., every time a message is sent).

For the case in which the routing tables are established before the message is sent, the routing tables need to be updated continuously to cope with moving devices. When devices belonging to the scatternet move around, they can cause scatternet links to break. When a link is broken, the scatternet needs to be at least partially re-formed, which in turn creates the need to update the routing tables.

Yet another drawback with reliance on scatternet technology to support a "chat" mechanism between short-range mobile devices is that scatternet mechanisms are not yet fully specified by the Bluetooth® SIG. It is expected that if and when the Bluetooth® SIG specifies the full-blown generic scatternet functionality, the solution will be rather complex.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Methods and apparatuses communicate a message from a first short-range transceiver device to one or more other short-range transceiver devices. In accordance with an aspect of the various embodiments, this involves determining a set of identifiers of one or more other short-range transceiver devices known by the first short-range transceiver device to be within direct communication range of the first short-range transceiver device. An outbound served nodes list is created that includes identifiers of other short-range transceiver devices known either to already have encountered the message or to be members of the set of identifiers. The message and the served nodes list are incorporated into an outbound data structure. For each short-range transceiver having an identifier that is a member of the set of identifiers, a previously nonexisting communication link is initiated; the outbound data structure is transmitted to the short-range transceiver having the identifier that is a member of the set of identifiers; and in response to a completed delivery of the outbound data structure, the communication link is terminated. In some embodiments, the members of the set of identifiers may be stored in a data structure such as a destination list, although this is not an essential feature. The data structure can then be used to identify each short-range transceiver having an identifier that is a member of the set of identifiers.

In accordance with another aspect, determining the set of identifiers comprises determining all device identifiers contained in a neighbor-list, wherein the neighbor list includes device identifiers of all other short-range transceiver devices known by the first short-range transceiver device to be within direct communication range of the first short-range transceiver device. This might be performed, for example, when the message originates in the first short-range transceiver device.

In another aspect creating the outbound served nodes list includes combining all identifiers that are members of the set of identifiers with an identifier of the first short-range transceiver device.

In yet another aspect, communicating the message involves incorporating at least one destination identifier into the outbound data structure. The at least one destination identifier may, for example, include any one or combination of the following: a destination address; a destination name; and a chat group identifier.

In yet another aspect, the first short-range transceiver device receives an inbound data structure from a second short-range transceiver device, wherein the inbound data structure includes the message.

In such cases, the inbound data structure includes an inbound served nodes list; and creating the outbound served nodes list can comprise combining identifiers included in the inbound served nodes list with identifiers of all other short-range transceiver devices known by the first short-range transceiver device to be within direct communication range of the first short-range transceiver device.

In still another aspect, no short-range transceiver device is identified more than once in the served nodes list after combining.

In yet another aspect, creating the outbound served nodes list includes combining identifiers included in the inbound served nodes list with identifiers of all other short-range transceiver devices known by the first short-range transceiver device to be within direct communication range of the first short-range transceiver device and with an identifier of the first short-range transceiver device.

In yet another aspect in which the data structure was received, the inbound data structure may include an inbound served nodes list. In some of these embodiments, determining the set of identifiers comprises: determining only those device identifiers that are included in a neighbor list but not also included in the inbound served nodes list, wherein the neighbor list includes device identifiers of all other short-range transceiver devices known by the first short-range transceiver device to be within direct communication range of the first short-range transceiver device.

In still another aspect, the inbound data structure includes an inbound message identifier that is compared with a list of previously received message identifiers. Further transmission of the outbound data structure is inhibited if a match is found between the inbound message identifier and any of the previously received message identifiers.

In yet another aspect, the inbound data structure includes a hop count, which is adjusted after reception. The adjusted hop count is then incorporated into the outbound data structure.

In still another aspect, the inbound data structure includes a hop count and a maximum number of hops value. The hop count is compared with the maximum number of hops value. Transmission of the outbound data structure is inhibited if the comparison between the hop count and the maximum number of hops value satisfies a predetermined relationship.

BRIEF DESCRIPTION OF THE DRAWINGS

The objects and advantages of the invention will be understood by reading the following detailed description in conjunction with the drawings in which.

DETAILED DESCRIPTION

Figure 1:
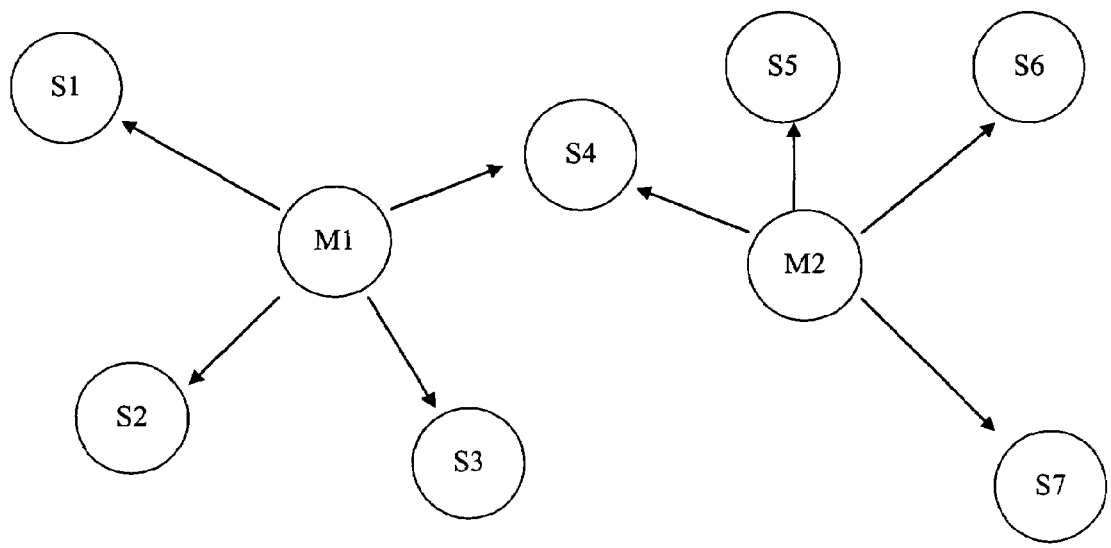
FIG. 1 is a diagram illustrating a scatternet communications topology.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An overview of the various embodiments to be described here is first presented. A mobile device that is capable of wireless messaging is disclosed. The mobile device includes an application that uses a wireless messaging service. An example of such an application is mobile chat, described earlier in the Background section. The mobile device further includes a short-range transceiver, capable of receiving and transmitting messages to its peers.

In one aspect, a received message can be forwarded to other devices so that the physical range of the network can be extended. All messages are transported in the network by temporary point-to-point links.

In some embodiments, the default mode for each device for which the wireless messaging application is activated is to listen for messages from other devices. In Bluetooth® technology-based embodiments, this mode is called page scan or inquiry scan. Each device keeps a list of all of its neighbors within range that have their wireless messaging application activated. The list is refreshed periodically by determining whether the neighbors can still be reached. This can be achieved by sending a page message to each device in the list. Devices that do not respond to the page message cannot be reached anymore and should therefore be deleted from the neighbor list. New devices that can be reached are detected by periodically sending an inquiry message. Devices responding to the inquiry message should be added to the neighbor list if not already included.

When a user creates and sends a message, the device sends the message to each device in the neighbor list. Similarly, if the device receives a message, its wireless messaging application can display the message to the user and also forward the message to other devices in its neighbor list.

These and other aspects of the invention will now be described in greater detail.

FIG. 1 shows a number of short-range transceiver devices that have formed a scatternet. For example, the short-range transceiver devices can operate in accordance with the Bluetooth® standards. There are two masters, M1 and M2. M1 is the master of slave devices S1, S2, S3 and S4. M2 is the master of slave devices S4, S5, S6 and S7. It will be observed that in this example, the slave device S4 is connected to both M1 and M2 and serves to bridge the two piconets together. From a networking perspective any device can communicate with any other device, since it is possible to find a path between any two of the devices.

M1 and M2 may take on the roles of routers. This means that they establish and maintain routing tables that describe different possible communication paths in the network. When a first device in a network wants to communicate with a second device in the network, the first device tries to find a router. The router knows whether the second device can be reached and if so, how. With this information, the message can be delivered to its destination.

Figure 2:
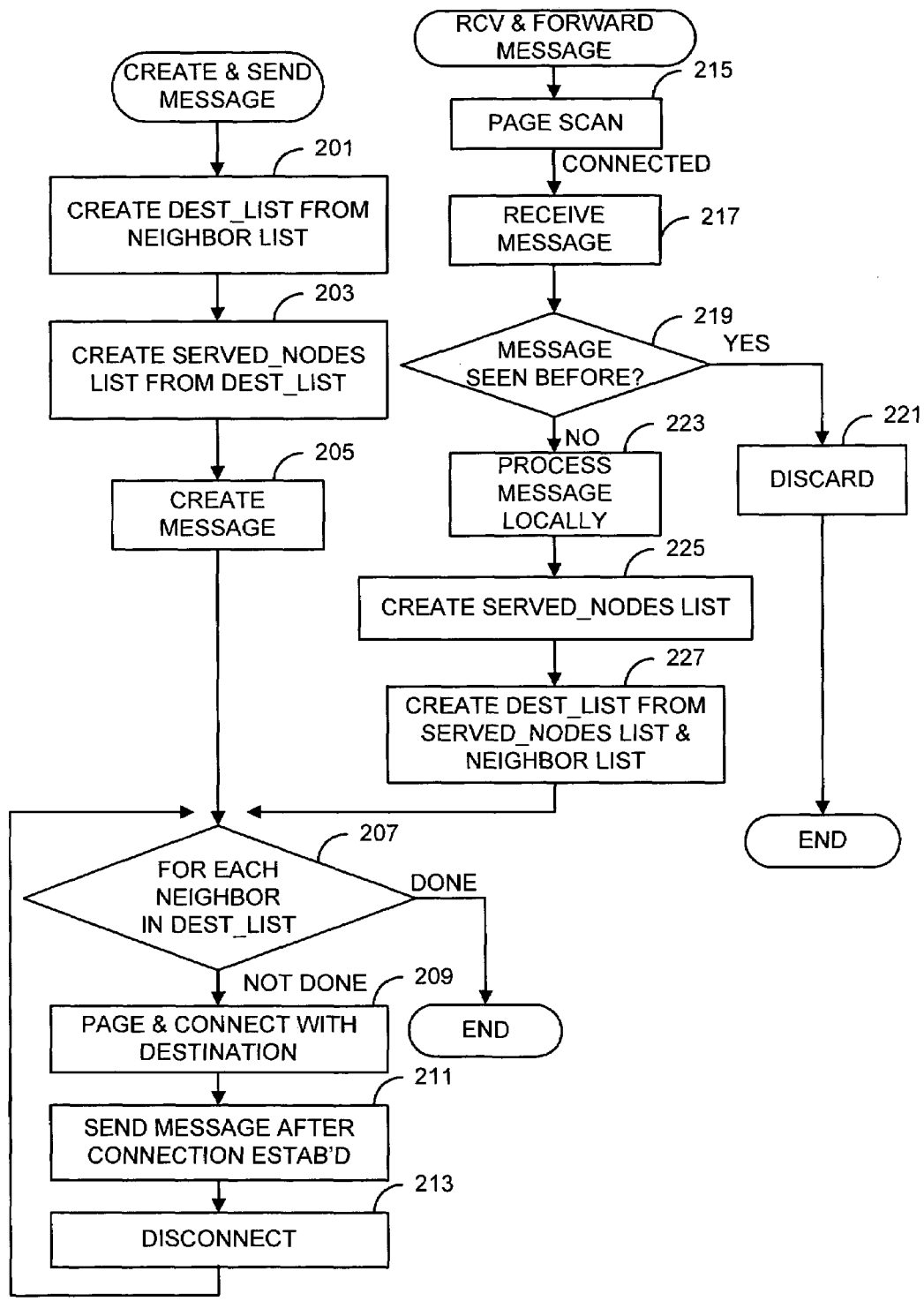
FIG. 2 is a flowchart of exemplary steps that are carried out by logic (e.g., a processor and/or other hardware components) within each short-range transceiver device in accordance with an aspect of the invention.

An embodiment of the invention avoids the need to rely on routers as described above. Instead, each node is responsible only for knowing who its neighbors are, and then communicating with some or all of these neighbors. FIG. 2 is a flowchart of exemplary steps that are carried out by logic (e.g., a processor and/or other hardware components) within each short-range transceiver device. Since the message must originate somewhere, the discussion begins by examining steps performed within the originating short-range transceiver device (henceforth, "originating device"). It is assumed that the originating device has previously established a neighbor list (i.e., a list of neighboring short-range transceiver devices) by sending and/or responding to earlier-sent inquiry messages. The originating device will now use that neighbor list to create a destination list (step 201). The destination list designates all of the intended recipients of the message. In this example, the originating device chooses to include all of its neighbors within the destination list. In alternative embodiments, it is anticipated that an originating device might further include some logic or algorithm for filtering out some of its neighbors from the destination list.

The originating device also creates a second list, called a served node list (step 203), that will inform recipients of the message of which devices have already encountered the message. This will eliminate the unnecessary step of the most recent recipients sending the message to those earlier recipient devices. Creating the served node list is simple: the originating device simply copies the destination list and adds its own identifier. This last step is performed to prevent recipients of the message from sending the message back to the originating device.

The originating device also uses any of a number of mechanisms for creating the message (step 205). For example, the originating device may include an application that permits a user to type in (usually short) text messages. Creating the user's part of the message may then simply involve running the associated text input application and collecting the text data entered by the user. Alternatively, the user's part of the message may have been entered at an earlier time, so that it is now necessary only to retrieve it from a storage location. It is also anticipated that, at some point in time, chat services may permit users to exchange not only simple text, but also image and/or audio data. Any form of message may be used with the various embodiments of the invention.

Additional information is added to the user's part of the message before it is passed on to any other devices. Only a few of the possibilities are discussed at the moment—others will be discussed below with reference to FIG. 3. One item of information that is added to the user's part of the message is the served node list, which was discussed above. In addition, if it is desired to limit distribution of the message to select ones of short-range transceiver devices within the vicinity of the originating device, information may be added to the message that in some form identifies the intended recipients (e.g., by identifying a destination address, destination name, and/or chat group).

When the message is ready for transmission, it is sent to each short-range transceiver device identified in the destination list. It should be recalled, however, that in the short-range transceiver device environment (e.g., in a Bluetooth®-based environment), there is generally no pre-existing connection established between the originating device and any of its neighbors, nor is there the desire at this point to create any long-lasting connections.

Thus, to send the message the originating device (or as will be seen later, any device performing this process) performs a particular process for each device identified in the destination list (decision block 207). The process involves paging and consequently establishing a connection with the considered device (step 209). Having established a connection, the device than sends the message (step 211). Upon completion of delivery of the message, the device disconnects from the neighboring device (step 213). What constitutes "completion of delivery" may vary from one embodiment to the next. In Bluetooth® networks, a transmitting device may consider the transmission complete when it receives an acknowledgement from the recipient device.

In alternative embodiments, the relevant standards that determine the protocol to be used in short-range transceiver communication may include the capability to attach the message to the paging message itself. In such embodiments, steps 209, 211, and 213 can be melded together into a single operation, in which the message is simply "pushed" to the neighboring device without a connection ever having been established.

Relevant to all of these embodiments is the fact that the originating device need not have already been a participant in an established network involving the neighboring device. In Bluetooth®-related embodiments, the process can be considered to be one in which the originating device establishes an ad hoc piconet with each of its neighbors for the duration of the transfer of the message from the master to the neighbor, at which point the piconet is torn down.

In another aspect, a short-range transceiver device may not be the originator of a message, but may instead be a recipient (henceforth "recipient device"). In this capacity, an exemplary process begins with the recipient device performing a page scan operation (step 215). Such an operation usually involves the device waking up from an idle mode, and scanning a frequency (determined in accordance with the relevant protocol standards) to detect whether another device is transmitting a paging message directed at the recipient device. If no such message is detected, then the device may simply return to an idle mode of operation for some period of time, at which point another page scan operation is performed.

If a paging message is received, the recipient device performs whatever connection establishment procedure is called for under the relevant communications protocol, and then receives the message on the newly established connection (step 217). Upon completion of delivery of the message, the connection may at this point be torn down.

If an embodiment includes the capability of selectively distributing a message to nearby other units, then the recipient device examines some part of the message and compares it with an internally stored list of messages that have been seen before (decision block 219). If a match is found ("YES" path out of decision block 219) then the message may simply be discarded (step 221). Such an occurrence can easily happen because, in this environment, no device has knowledge of who its neighbors are transmitting messages to. Consequently, two or more short-range transceiver devices may transmit the same message to a shared neighboring device.

If the received message has not been seen before by the recipient device ("NO" path out of decision block 219), then the message is processed locally (step 223). The particular aspects of local processing will be application-specific, and therefore cannot be entirely specified here. Such processing may involve, for example, presenting the received message on a user display device. Other operations, such as reproducing an audio or video message, can also be envisaged.

In addition to processing the message locally, the recipient device passes the message along to those neighbors who it determines have not yet received the message. This involves creating (or updating) a served node list (step 225). One way of doing this is by copying (or otherwise including or combining) the served node list that accompanied the message (i.e., the inbound served node list) and adding the identifiers from the recipient device's neighbor list to the intended outbound served node list, while preferably taking steps to avoid any particular identifier being represented in the outbound served node list more than once. This new outbound served node list will then be communicated along with the outbound message.

The recipient device also creates a new destination list (step 227) that it will work from when it comes time to actually transmit the message. This may be accomplished by starting with the recipient device's neighbor list, and removing the identities of those short-range transceiver devices that are also identified in the originally received copy of the served node list (i.e., the inbound served node list). What remains is then a list of neighbors who may not yet have received the message.

Transmitting the message to each of the short-range transceiver devices on the destination list is then performed in the same manner as was described above with respect to the originating device (see the process beginning at step 207). Accordingly, this process will not be described again here.

Figure 3:
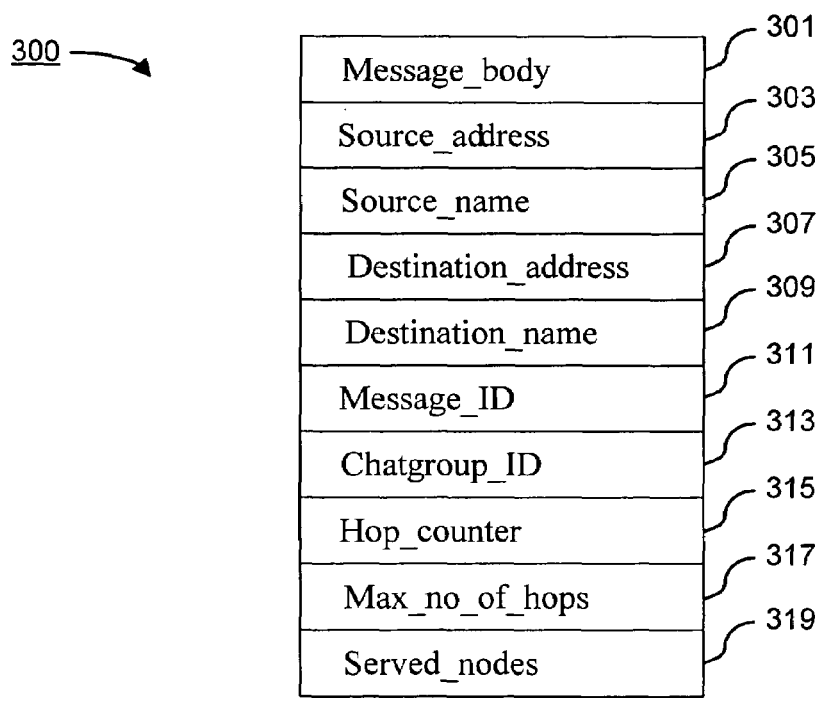
FIG. 3 is showing an exemplary data structure in accordance with an aspect of the invention.

As should be apparent from the above, certain control-related information needs to be passed along with the user's part of the message in order to ensure proper distribution of the message. In another aspect of embodiments described here, the message passed from one short-range transceiver device to another may include information elements as illustrated in the data structure 300 depicted in FIG. 3. While FIG. 3 shows information elements arranged in a particular order, this arrangement is by no means essential to the invention. To the contrary, any arrangement of and/or form of encoding this information is acceptable, and it is anticipated that not every item of information illustrated in FIG. 3 will be included in every embodiment. These are, to a large extent, design choices that by their nature cannot be fully enumerated here.

Each field in the exemplary data structure 300 will now be described:

Message_body field 301: contains the actual message that has been generated by a user application. The message may, for example contain alphanumeric characters and be coded in any well-known format, such as ASCII or Unicode.

Source_address field 303: contains an identifier of the device that generated the chat_message (e.g., it may be a BD address).

Source_name field 305: contains the user name of the user that originated the message.

Destination_address field 307: contains a number of identifiers (e.g., BD-addresses) identifying the devices for whom the message is meant to be received.

Destination_name field 309: the names of the users for whom the message is meant to be received.

Message_ID field 311: a unique number that is assigned to the message by the originating device. When a device receives a message it stores the Message_ID in a list. If the Message ID is already in the list, then the received message should be discarded and not forwarded to any neighbors. To avoid having the list of Message_IDs grow too large, the list can have a maximum size and a FIFO principle applied. Alternatively, each Message_ID can be stored with a timestamp. The Message_ID can then be deleted after a pre-determined time.

Chatgroup_ID field 313: Individual chat groups can be established. A chat group comprises a number of users that wish to communicate with one another without exposing their messages to others outside the group. Each chat group has its own identifier, here denoted Chatgroup_ID. A message can be created using the Chatgroup_ID as an addressing means instead of the Source_address. When a device receives a message with a valid Chatgroup_ID then the device should compare the received Chatgroup_ID with the identifiers of the chat groups in which it is active, in order to determine whether the message should be displayed or not.

Hop_counter field 315: the Hop_counter is used to limit the size of the network. It is preferably initialized to zero by the device that created the original message. A device that forwards a received message to other nodes must increment the Hop_counter by 1 so that the receiving note will have accurate information.

Max_no_of hops field 317: To limit how far a message can travel in an attempt to reach target recipients, the message originator can specify how many hops a message can make by setting the Max_no_of_hops to a valid value. When a device receives a message and the received Hop_counter value equals or exceeds a predetermined Max_no_of_hops value, the device should not forward the message to other devices.

Served_nodes field 319: This is a list containing identifiers (e.g., BD addresses or user names) of all devices that are known to have received the message. A device that receives a message should only forward the received message to devices that are present in the device's own neighbor list, but not to those in the received (i.e., inbound) Served_nodes list. The BD address of the devices to which the message will now be forwarded should be appended to the Served_nodes list before forwarding the message to any other device. By so doing, the Served_nodes field contains a superset of the neighbor lists of all the devices backwards in the chain all the way back to the originating device.

Figure 4:
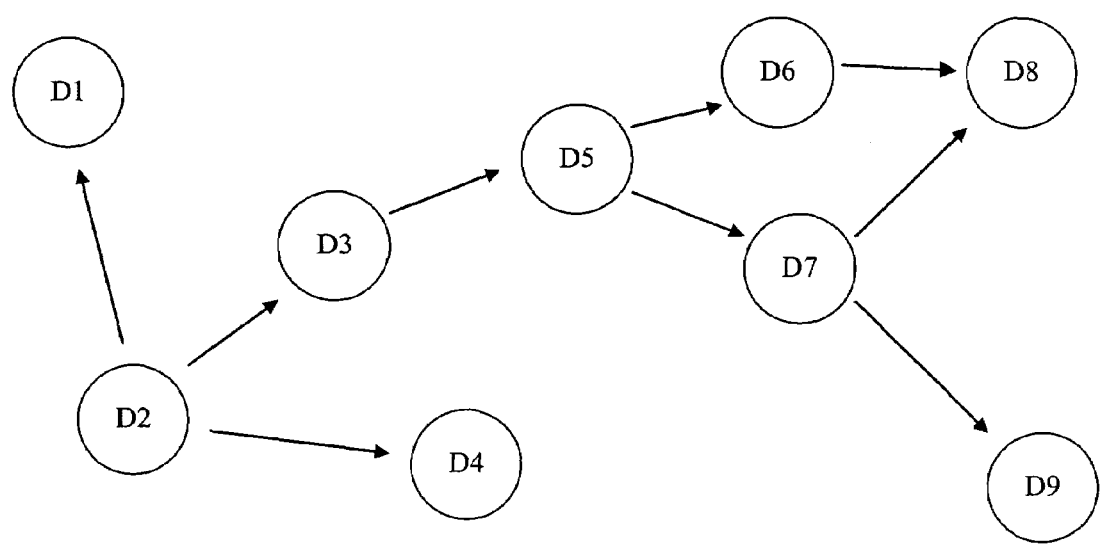
FIG. 4 is a diagram illustrating an exemplary flow of a message in a network, in accordance with an aspect of the invention.

An example will now be presented with reference to FIG. 4 that illustrates how a message travels through a succession of short-range transceiver devices, in accordance with an aspect of the invention. In this example a device, D2, is instructed by its user to send a text message to all other devices that are within reach.

As a background process, all devices, D1-D9, periodically check which neighbors they can reach (e.g., by means of an inquiry scan). Suppose that, at the moment when D2 creates its message, each device's neighbor list looks as follows:

D1's list: [D2, D3]
D2's list: [D1, D3, D4]
D3's list: [D1, D2, D5]
D4's list: [D2]
D5's list: [D3, D6, D7]
D6's list: [D5, D7, D8]
D7's list: [D5, D6, D8, D9]
D8's list: [D6, D7]
D9's list: [D7]

As the originating device, D2 creates a message and sends it to D1, D3 and D4 (i.e., to each of its neighboring devices). The Served_nodes list included within the message data structure contains D2's own identifier plus its neighbor list: [D1, D2, D3, D4].

D1 receives the message, possibly processes it locally (if it is an intended recipient), and it determines that all of its neighbors (D2 and D3) are already included within the Served_nodes field 319, so no further forwarding of the message is necessary on its part.

D3 analyzes the received message, possibly processes it locally, and determines that each of its neighboring nodes D1 and D2 are already included within the Served_nodes field 319, so no further forwarding of the message to these nodes is necessary. However, the node D5, which is one of D3's neighbors, is not present in the received (inbound) Served_nodes field 319. Therefore D3 forwards the message to D5, now with the Served_nodes field 319=[D1, D2, D3, D4, D5].

D4 receives the message, possibly processes it locally (if it is an intended recipient), and it determines that its neighbor (D2) is already included within the Served_nodes field 319, so no further forwarding of the message to that node is necessary. If any other ones of the nodes D5, D6, D7, D8, D9 were within range of the node D4, it would add these nodes' identifiers to the Served_nodes field 319, and forward the message to those neighboring nodes. However, in this example those node are not within range of the node D4, so the node D4 does not forward the message to any other node.

D5 analyzes the message received from the node D3 and, after possibly processing it locally, forwards it to each of the nodes D6 and D7 (assume that the nodes D8 and D9 are not within range of the nodeD5), this time with the Served_nodes field 319=[D1, D2, D3, D4, D5, D6, D7].

D6 analyzes the received message and, after possibly processing it locally, determines from the Served_nodes field 319 that two of its neighbors (D5 and D7) are already receiving the message. Therefore D6 does not forward the message to these nodes. D6's remaining neighbor, D8, is not receiving the message from any other node, so D6 forwards the message to D8.

D7 also analyzes the received message and, in addition to possibly processing it locally, decides to forward it to its neighboring nodes D8 and D9 now with the Serve_nodes field 319=[D1, D2, D3, D4, D5, D6, D7, D8, D9].

D8 has now received the same message from both D6 and D7. However D8 will detect that the two messages have the same Message_ID and consequently will discard one of the duplicate messages. "Discarding" a message may mean taking no further action with respect to the message, or may involve some other clean-up steps, depending on the particular embodiment. As a minimum, "discarding" includes any way of inhibiting any further transmission of the message. As used herein, the term "inhibiting" is meant to include all possibilities of action or inaction that result in the message not being further transmitted.

As to the first message that D8 receives (i.e., the one from either D6 or D7 that arrived before the duplicate), D8 analyzes the received message, possibly processes it locally, and determines that each of its neighboring nodes D6 and D6 are already included within the Served_nodes field 319, so no further forwarding of the message to these nodes is necessary.

D9 receives the message from D7, possibly processes it locally (if it is an intended recipient), and it determines that its only neighbor (D7) is already included within the Served_nodes field 319, so no further forwarding of the message is necessary on its part.

In yet another embodiment, it is possible to send encrypted messages between two or more devices. The encryption key that enables the receiver to decrypt the message must be distributed in a secure way. It can, for example, be agreed verbally between users. Alternatively, an encryption strategy whereby each user distributes his or her public encryption key to other users can be adopted. In accordance with these types of encryption strategies, a message intended for a given user is first encrypted using that user's public encryption key. The intended recipient then decrypts the received message by means of a private encryption key, known only to the intended recipient. Such encryption strategies are well-known, and need not be described here in detail.

It should be apparent how, utilizing the various aspects described above, one or more chat groups can be established between multiple devices that are potentially moving around over a limited space (e.g., a schoolyard). Several types of chat groups can be established. For example, the chat group can comprise any device that receives and potentially forwards the message. In such groups, every recipient of the message can process the message (e.g., have the message displayed on the device). In an alternative chat group, sub-groups are consciously established, such that only members of the sub-group can process a message that was directed to that particular chat group.

It should be understood that the underlying transport mechanism of the messages is independent of which type of chat group(s) is/are involved. The transport or message delivery in all cases is done by a simple broadcast mechanism, in which each message is sent to all devices in the local environment, regardless of chat group type. It is then up to each device to make a decision whether to process (e.g., display) the message or not. This decision may be based on parameters including, but not limited to: "has the message already been received and displayed?", "is the message meant for everyone?", "is the message meant for a sub-group to which I belong?", and the like. As mentioned earlier, encryption can be used to ensure that only those users who belong to the targeted sub-group can process the message.

A key aspect is the message delivery system. To ensure that all devices are reached in an efficient way, without the need for establishing and maintaining a complicated scatternet, the concepts of locally managed neighbor lists and a served node list (that travels with each message branch) are used. The purpose of the served nodes list is to keep track of all the nodes that have received (or originated) the message in a particular branch of the delivery process. Each device's neighbor list is a list of devices that are within communication range of that device. Each device maintains its neighbor list by, for example, paging/inquiring/scanning as a background task.

When a device receives a message, it should process (e.g., display) it if the message was meant for everyone or alternatively if the message was meant for a sub-group to which the receiving device belongs. Regardless of whether the receiving device processes the message, it should then forward message to all of its neighbors except for those listed in the served nodes list that arrived with the received message—the neighbors excepted from further distribution of the message already received the message and therefore do not need to receive it again. Before forwarding the message, the device appends to the served nodes list the identifiers of those nodes to whom it intends to forward the message.

The present invention deal with the drawbacks of conventional messaging strategies in the following ways:

The scheduling problem is minimized because devices need only to support simple point-to-point links.

The networking problem is simplified because each node needs only to be aware of its own neighbors. None of the participating devices needs to take on a centralized networking role such as that of router. The various embodiments truly form a distributed system.

The mobility problem is minimized because the damage caused by a device moving out of range of the other devices is cured by the simple periodic updating of neighbor lists.

It will be readily apparent to those skilled in the art that the invention is applicable to applications other than wireless chat. The principles can be used for any wireless application where it is desirable to broadcast a message to a number of other devices or to extend the operational range of a radio system. The way the various embodiments deal with this can be applied in applications such as sensor networks, meter reading networks, building automation networks or industrial automation networks.

The invention has been described with reference to particular embodiments. However, it will be readily apparent to those skilled in the art that it is possible to embody the invention in specific forms other than those of the embodiment described above.

For example, embodiments involving the creation of a destination list have been described. It is possible, however, to implement various aspects of the invention in embodiments that do not create a distinct entity identifiable as a destination list. For example, consider the following pseudocode:

```
OutboundServedNodes:=InboundServedNodes   //* create a copy of the
                                              served
                                          //* nodes
For each Identifier in the Neighbor list
Begin
    If Neighbor.Identifier is not present in InboundServedNodes then
```

-continued

```
        Add Neighbor.Identifier to OutboundServedNodes;
End;
For each Identifier in the OutboundServedNodes
Begin
    If OutboundServedNodes.identifier is not present in
    InboundServedNodes
        Transmit message to OutboundServedNodes.identifier
End;
```

In this example, there is no distinct entity identifiable as a destination list. Instead, the data structures OutboundServedNodes.identifier and InboundServedNodes are compared with one another to determine, on an as-needed basis, the set of identifiers of those transceivers who are the intended recipients of the message, making it unnecessary to store the set of identifiers as a distinct data structure. Creating a destination list is just one example of determining those identifiers, and is an example in which a distinct data structure comes into existence.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of communicating a message from a first short-range transceiver device to one or more other short-range transceiver devices, the method comprising:

determining a set of identifiers of one or more other short-range transceiver devices known by the first short-range transceiver device to be within direct communication range of the first short-range transceiver device;

creating an outbound served nodes list that includes identifiers of other short-range transceiver devices known either to already have encountered the message or to be members of the set of identifiers;

incorporating the message and the outbound served nodes list into an outbound data structure;

for each short-range transceiver having an identifier that is a member of the set of identifiers, performing:
  initiating a previously nonexisting communication link;
  transmitting the outbound data structure to the short-range transceiver having the identifier that is a member of the set of identifiers; and
  in response to a completed delivery of the outbound data structure, terminating the communication link;

the first short-range transceiver device receiving an inbound data structure from a second short-range transceiver device, wherein the inbound data structure includes the message, and wherein:

the inbound data structure includes an inbound served nodes list; and determining the set of identifiers comprises:
  determining only those device identifiers that are included in a neighbor list but not also included in the inbound served nodes list, wherein the neighbor list includes identifiers of all other short-range transceiver devices known by the first short-range transceiver device to be within direct communication range of the first short-range transceiver device.

2. The method of claim 1, wherein determining the set of identifiers comprises:

determining all device identifiers contained in a neighbor list, wherein the neighbor list includes identifiers of all other short-range transceiver devices known by the first short-range transceiver device to be within direct communication range of the first short-range transceiver device.

3. The method of claim 2, wherein creating the outbound served nodes list comprises:
combining all identifiers that are members of the set of identifiers with an identifier of the first short-range transceiver device.

4. The method of claim 1, comprising:
incorporating at least one destination identifier into the outbound data structure.

5. The method of claim 4, wherein the at least one destination identifier includes a destination address.

6. The method of claim 4, wherein the at least one destination identifier includes a destination name.

7. The method of claim 4, wherein the at least one destination identifier includes a chat group identifier.

8. The method of claim 1, wherein:
the inbound data structure includes an inbound served nodes list; and
creating the outbound served nodes list comprises:
combining identifiers included in the inbound served nodes list with identifiers of all other short-range transceiver devices known by the first short-range transceiver device to be within direct communication range of the first short-range transceiver device.

9. The method of claim 8, comprising:
ensuring that no short-range transceiver device is identified more than once in the outbound served nodes list after combining.

10. The method of claim 8, wherein creating the outbound served nodes list comprises:
combining identifiers included in the inbound served nodes list with identifiers of all other short-range transceiver devices known by the first short-range transceiver device to be within direct communication range of the first short-range transceiver device and with an identifier of the first short-range transceiver device.

11. A method of communicating a message from a first short-range transceiver device to one or more other short-range transceiver devices, the method comprising:
determining a set of identifiers of one or more other short-range transceiver devices known by the first short-range transceiver device to be within direct communication range of the first short-range transceiver device;
creating an outbound served nodes list that includes identifiers of other short-range transceiver devices known either to already have encountered the message or to be members of the set of identifiers;
incorporating the message and the outbound served nodes list into an outbound data structure;
for each short-range transceiver having an identifier that is a member of the set of identifiers, performing:
initiating a previously nonexisting communication link;
transmitting the outbound data structure to the short-range transceiver having the identifier that is a member of the set of identifiers; and
in response to a completed delivery of the outbound data structure, terminating the communication link; and
the first short-range transceiver device receiving an inbound data structure from a second short-range transceiver device,
wherein the inbound data structure includes the message, and
wherein:
the inbound data structure includes an inbound message identifier; and
the method comprises:
comparing the inbound message identifier with a list of previously received message identifiers; and
inhibiting transmission of the outbound data structure if a match is found between the inbound message identifier and any of the previously received message identifiers.

12. The method of claim 1, wherein:
the inbound data structure includes a hop count; and
the method comprises:
adjusting a value of the hop count; and
incorporating the adjusted hop count into the outbound data structure.

13. A method of communicating a message from a first short-range transceiver device to one or more other short-range transceiver devices, the method comprising:
determining a set of identifiers of one or more other short-range transceiver devices known by the first short-range transceiver device to be within direct communication range of the first short-range transceiver device;
creating an outbound served nodes list that includes identifiers of other short-range transceiver devices known either to already have encountered the message or to be members of the set of identifiers;
incorporating the message and the outbound served nodes list into an outbound data structure;
for each short-range transceiver having an identifier that is a member of the set of identifiers, performing:
initiating a previously nonexisting communication link;
transmitting the outbound data structure to the short-range transceiver having the identifier that is a member of the set of identifiers; and
in response to a completed delivery of the outbound data structure, terminating the communication link; and
the first short-range transceiver device receiving an inbound data structure from a second short-range transceiver device,
wherein the inbound data structure includes the message, and
wherein:
the inbound data structure includes a hop count and a maximum number of hops value; and
the method comprises:
comparing the hop count with the maximum number of hops value; and
inhibiting transmission of the outbound data structure if the comparison between the hop count and the maximum number of hops value satisfies a predetermined relationship.

14. The method of claim 1, comprising:
creating a data structure comprising all members of the set of identifiers; and
using the data structure to identify each short-range transceiver having an identifier that is a member of the set of identifiers.

15. An apparatus for communicating a message from a first short-range transceiver device to one or more other short-range transceiver devices, the apparatus comprising:
logic that determines a set of identifiers of one or more other short-range transceiver devices known by the first short-range transceiver device to be within direct communication range of the first short-range transceiver device;

logic that creates an outbound served nodes list that includes identifiers of other short-range transceiver devices known either to already have encountered the message or to be members of the set of identifiers;

logic that incorporates the message and the outbound served nodes list into an outbound data structure;

logic that, for each short-range transceiver having an identifier that is a member of the set of identifiers, performs:
  initiating a previously nonexisting communication link;
  transmitting the outbound data structure to the short-range transceiver having the identifier that is a member of the set of identifiers; and
  in response to a completed delivery of the outbound data structure, terminating the communication link;

logic that receives an inbound data structure from a second short-range transceiver device, wherein the inbound data structure includes the message, and wherein:
the inbound data structure includes an inbound served nodes list; and
the logic that determines the set of identifiers comprises:
  logic that determines only those device identifiers that are included in a neighbor list but not also included in the inbound served nodes list, wherein the neighbor list includes device identifiers of all other short-range transceiver devices known by the first short-range transceiver device to be within direct communication range of the first short-range transceiver device.

16. The apparatus of claim 15, wherein the logic that determines the set of identifiers comprises:
logic that determines all identifiers contained in a neighbor list, wherein the neighbor list includes identifiers of all other short-range transceiver devices known by the first short-range transceiver device to be within direct communication range of the first short-range transceiver device.

17. The apparatus of claim 16, wherein the logic that creates the outbound served nodes list comprises:
logic that combines all identifiers that are members of the set of identifiers with an identifier of the first short-range transceiver device.

18. The apparatus of claim 15, comprising:
logic that incorporates at least one destination identifier into the outbound data structure.

19. The apparatus of claim 18, wherein the at least one destination identifier includes a destination address.

20. The apparatus of claim 18, wherein the at least one destination identifier includes a destination name.

21. The apparatus of claim 18, wherein the at least one destination identifier includes a chat group identifier.

22. The apparatus of claim 15, wherein:
the inbound data structure includes an inbound served nodes list; and
the logic that creates the outbound served nodes list comprises:
  logic that combines identifiers included in the inbound served nodes list with identifiers of all other short-range transceiver devices known by the first short-range transceiver device to be within direct communication range of the first short-range transceiver device.

23. The apparatus of claim 22, comprising:
logic that ensures that no short-range transceiver device is identified more than once in the outbound served nodes list after combining.

24. The apparatus of claim 22, wherein the logic that creates the outbound served nodes list comprises:
logic that combines identifiers included in the inbound served nodes list with identifiers of all other short-range transceiver devices known to be within direct communication range of the first short-range transceiver device and with an identifier of the first short-range transceiver device.

25. An apparatus for communicating a message from a first short-range transceiver device to one or more other short-range transceiver devices, the apparatus comprising:
logic that determines a set of identifiers of one or more other short-range transceiver devices known by the first short-range transceiver device to be within direct communication range of the first short-range transceiver device;

logic that creates an outbound served nodes list that includes identifiers of other short- range transceiver devices known either to already have encountered the message or to be members of the set of identifiers;

logic that incorporates the message and the outbound served nodes list into an outbound data structure;

logic that, for each short-range transceiver having an identifier that is a member of the set of identifiers, performs:
  initiating a previously nonexisting communication link;
  transmitting the outbound data structure to the short-range transceiver having the identifier that is a member of the set of identifiers; and
  in response to a completed delivery of the outbound data structure, terminating the communication link;

logic that receives an inbound data structure from a second short-range transceiver device, wherein the inbound data structure includes the message, and wherein:
the inbound data structure includes an inbound message identifier; and
the apparatus comprises:
  logic that compares the inbound message identifier with a list of previously received message identifiers; and
  logic that inhibits transmission of the outbound data structure if a match is found between the inbound message identifier and any of the previously received message identifiers.

26. The apparatus of claim 15, wherein:
the inbound data structure includes a hop count; and
the apparatus comprises:
  logic that adjusts a value of the hop count; and
  logic that incorporates the adjusted hop count into the outbound data structure.

27. An apparatus for communicating a message from a first short-range transceiver device to one or more other short-range transceiver devices, the apparatus comprising:
logic that determines a set of identifiers of one or more other short-range transceiver devices known by the first short-range transceiver device to be within direct communication range of the first short-range transceiver device;

logic that creates an outbound served nodes list that includes identifiers of other short- range transceiver devices known either to already have encountered the message or to be members of the set of identifiers;

logic that incorporates the message and the outbound served nodes list into an outbound data structure;

logic that, for each short-range transceiver having an identifier that is a member of the set of identifiers, performs:
  initiating a previously nonexisting communication link;

transmitting the outbound data structure to the short-range transceiver having the identifier that is a member of the set of identifiers; and in response to a completed delivery of the outbound data structure, terminating the communication link;

logic that receives an inbound data structure from a second short-range transceiver device, wherein the inbound data structure includes the message, and wherein:

the inbound data structure includes a hop count and a maximum number of hops value; and the apparatus comprises:

logic that compares the hop count with the maximum number of hops value; and logic that inhibits transmission of the outbound data structure if the comparison between the hop count and the maximum number of hops value satisfies a predetermined relationship.

28. The apparatus of claim 15, comprising:

logic that creates a data structure comprising all members of the set of identifiers; and logic that uses the data structure to identify each short-range transceiver having an identifier that is a member of the set of identifiers.

29. A mobile communication device comprising the apparatus of claim 15.

30. A machine readable storage medium having stored therein a set of program instructions for communicating a message from a first short-range transceiver device to one or more other short-range transceiver devices, the set of program instructions causing a processor and associated logic to perform:

determining a set of identifiers of one or more other short-range transceiver devices known by the first short-range transceiver device to be within direct communication range of the first short-range transceiver device;

creating an outbound served nodes list that includes identifiers of other short-range transceiver devices known either to already have encountered the message or to be members of the set of identifiers;

incorporating the message and the outbound served nodes list into an outbound data structure;

for each short-range transceiver having an identifier that is a member of the set of identifiers, performing:

initiating a previously nonexisting communication link;

transmitting the outbound data structure to the short-range transceiver having the identifier that is a member of the set of identifiers; and in response to a completed delivery of the outbound data structure, terminating the communication link;

the first short-range transceiver device receiving an inbound data structure from a second short-range transceiver device, wherein the inbound data structure includes the message, and wherein:

the inbound data structure includes an inbound served nodes list; and determining the set of identifiers comprises:

determining only those device identifiers that are included in a neighbor list but not also included in the inbound served nodes list, wherein the neighbor list includes identifiers of all other short-range transceiver devices known by the first short-range transceiver device to be within direct communication range of the first short-range transceiver device.

\* \* \* \* \*

UNITED STATES PATENT AND TRADEMARK OFFICE
CERTIFICATE OF CORRECTION

PATENT NO. : 7,546,086 B2  
APPLICATION NO. : 11/020980  
DATED : June 9, 2009  
INVENTOR(S) : Hansson Page 1 of 1

It is certified that error appears in the above-identified patent and that said Letters Patent is hereby corrected as shown below:

In Column 3, Line 14, delete "neighbor-list," and insert -- neighbor list, --, therefor.

In Column 4, Line 22, after "FIG. 3 is" insert -- a diagram --.

In Column 11, Line 20, insert -- the --, before "message".

In Column 16, Line 18, in Claim 25, delete "short- range" and insert -- short-range --, therefor.

In Column 16, Line 60, in Claim 27, delete "short- range" and insert -- short-range --, therefor.

In Column 17, Line 28, in Claim 30, delete "machine readable" and insert -- machine-readable --, therefor.

Signed and Sealed this

Tenth Day of November, 2009

David J. Kappos  
*Director of the United States Patent and Trademark Office*